United States Patent
Knueve et al.

(10) Patent No.: US 6,478,130 B2
(45) Date of Patent: Nov. 12, 2002

(54) CLUTCH FRICTION BUTTON

(75) Inventors: Roger E. Knueve, Convoy, OH (US); John David Conrad, Auburn, IN (US); Loren H. Uthoff, Jr., Northville, MI (US)

(73) Assignee: Eaton Corporation, Cleveland, OH (US)

(*) Notice: Subject to any disclaimer, the term of this patent is extended or adjusted under 35 U.S.C. 154(b) by 25 days.

(21) Appl. No.: 09/748,570

(22) Filed: Dec. 22, 2000

(65) Prior Publication Data

US 2002/0079189 A1 Jun. 27, 2002

(51) Int. Cl.[7] .............................................. F16D 69/00
(52) U.S. Cl. .............................. 192/107 R; 192/113.22
(58) Field of Search ........................ 192/107 R, 70.14, 192/113.22; 188/218 L

(56) References Cited

U.S. PATENT DOCUMENTS

| | | |
|---|---|---|
| 384,268 A | 6/1888 | Nelson |
| 2,849,092 A | 8/1958 | Foster |
| 3,303,911 A | 2/1967 | Hause et al. |
| 3,347,107 A | 10/1967 | Flichy |
| 3,412,836 A * | 11/1968 | Wilmer ................. 188/218 XL |
| 3,455,423 A * | 7/1969 | Lindquist ................. 192/107 R |
| 3,480,117 A | 11/1969 | Agren et al. |
| 4,139,085 A * | 2/1979 | Kanbe et al. ........... 192/107 R |
| 4,565,274 A | 1/1986 | Cameron |
| 5,158,165 A | 10/1992 | Flotow |

* cited by examiner

Primary Examiner—Rodney H. Bonck
(74) Attorney, Agent, or Firm—Kevin M. Hinman

(57) ABSTRACT

A clutch button is provided including a friction pad having first and second surfaces. The friction pad has a radial outer and inner edges. The friction pad also has first and second upper outward circumferential edges adjacent to the radial outer edge. The friction pad has first and second lower outward circumferential edges adjacent to the radial inner edge. The friction pad has first and second inward circumferential outer edges joining the respective first and second outward upper and lower circumferential edges. The friction pad has a first groove formed in the first surface extending from the first upper outward circumferential edge to one of the second upper and lower outward circumferential edges. A second groove is formed in the first surface extending from the first lower outward circumferential edge to the other one of the second upper or lower circumferential edges the first groove does not extend to. A backing plate is bonded to the second surface.

13 Claims, 5 Drawing Sheets

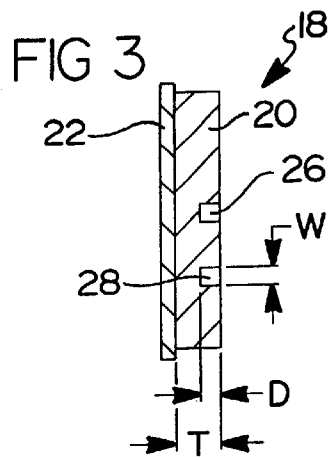
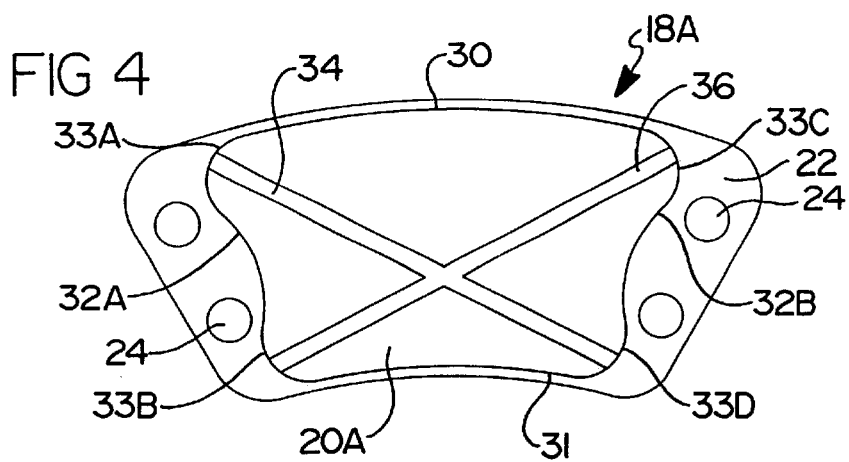
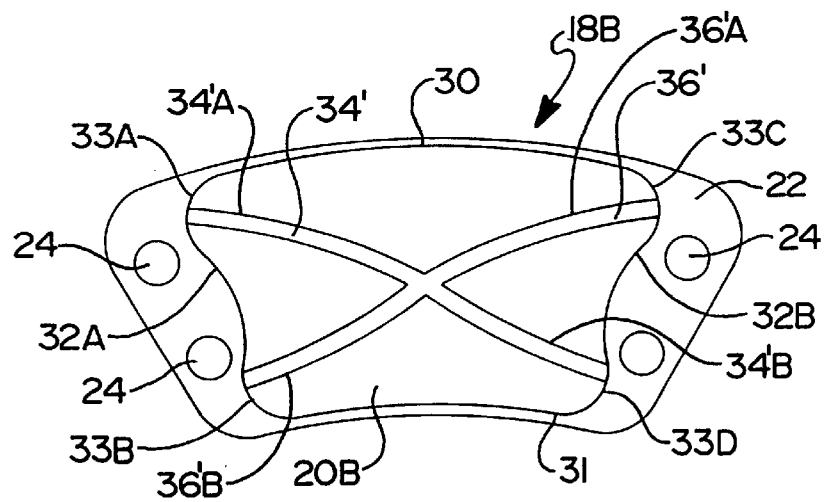

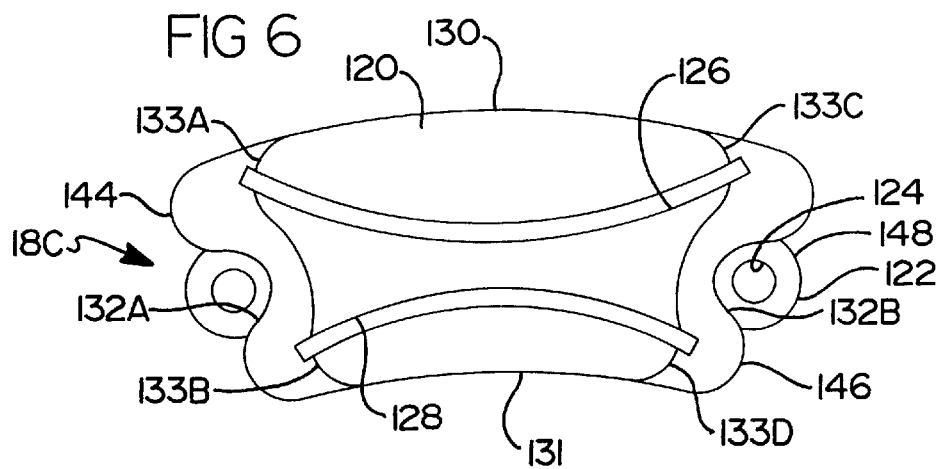
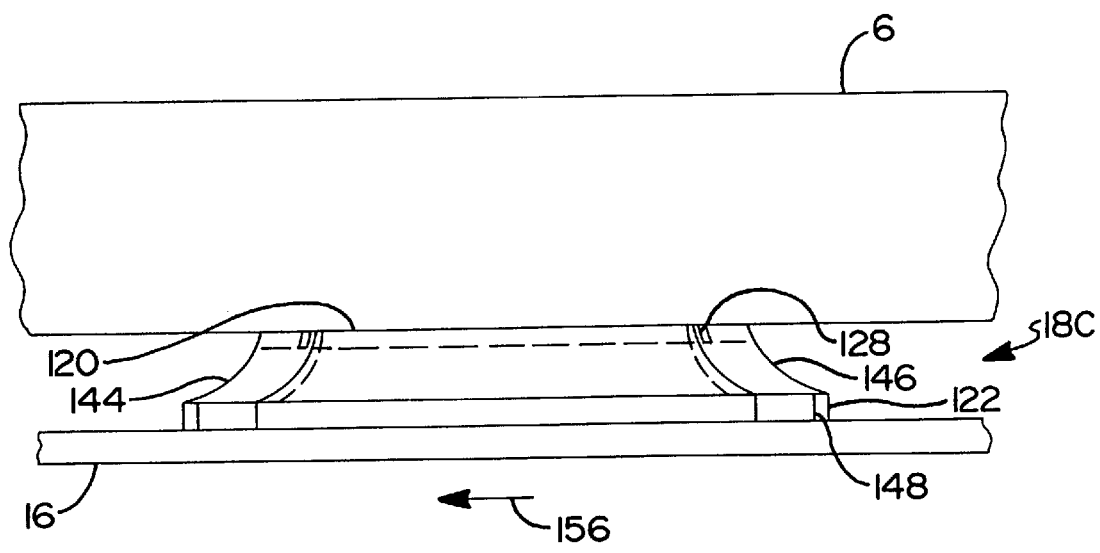

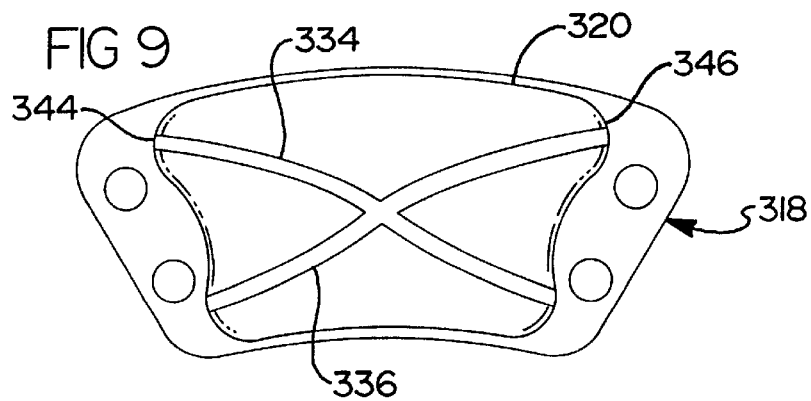
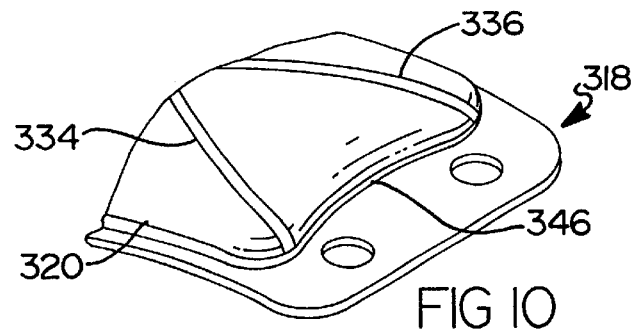
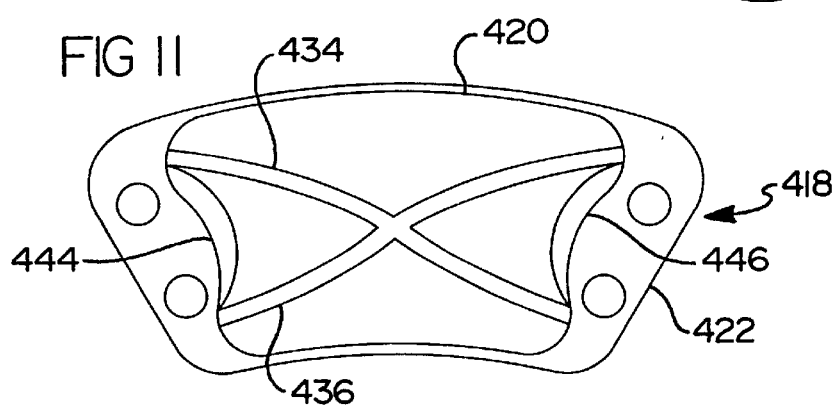
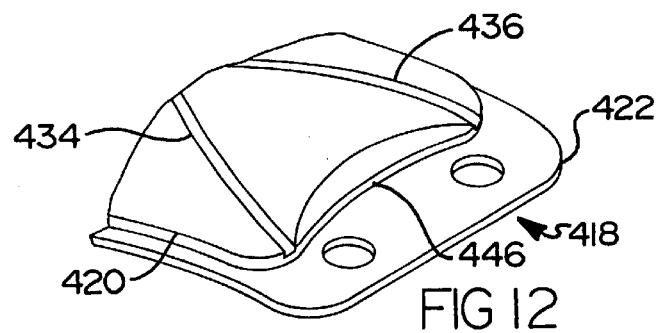

CLUTCH FRICTION BUTTON

BACKGROUND OF THE INVENTION

1. Field of the Invention

The present invention relates to a friction button for fastening to a clutch disc. More specifically, the present invention relates to a friction button for fastening to a clutch disc where grooves and/or contours are formed in a face of the clutch button for improved clutch release.

2. Description of the Prior Art

Typically, a plurality of clutch buttons are fastened to a motor vehicle clutch disc. The clutch disc assembly is used in a clutch assembly to transmit drive forces from a prime mover such as an internal combustion engine to an input shaft of a transmission, which in turn multiplies the torque by a selected gear ratio and transmits it to an output shaft such as a vehicle driveshaft. Prior art clutch buttons often have a backing plate on which a friction material is fixedly disposed. The buttons are spaced circumferentially about the clutch disc with the friction material facing outwardly. The buttons are commonly fixed to the disc by riveting the backing plates to the disc. The disc is selectively engaged with a drive disc, commonly a flywheel, to transmit a rotational driving force to an output shaft. A spring loaded engagement member, such as a pressure plate, presses the clutch disc against the drive disc in the engaged condition. The frictional engagement causes the clutch disc to rotate with the flywheel. Commonly, the friction material has both a smooth continuous inner face which is bonded to the backing plate and a smooth continuous outer face which contacts the drive disc (flywheel or pressure plate).

One problem with the prior art clutch assemblies is that the clutch disc tends to remain in contact with either the flywheel or the pressure plate even if the clutch is disengaged, especially when the clutch is at an elevated temperature. The resultant undesired frictional drag on the clutch disc causes difficulty in the selecting the desired transmission gear ratio.

Configuring the friction material to facilitate cooling is believed to facilitate certain aspects of clutch performance. Indeed, it is known to provide a spacing between portions of the clutch button friction material to facilitate cooling of the friction material. U.S. Pat. No. 5,158,165, assigned to the assignee of this application, discloses spacing portions of friction material from each other to form a central void to facilitate air movement therebetween for improved cooling of the clutch button. It is also known to provide a plurality of radially extending grooves in the face of a friction material to facilitate fluid movement across the face for improved cooling of the friction material and of the structure to which it is mounted. However, while the known spacings and grooves facilitate cooling, they are not well suited to facilitating the separation of the disc from the pressure plate and flywheel.

It would be desirable to provide a clutch which features a low drag torque on the clutch disc when the clutch is disengaged. Enhancing separation of the clutch disc from the drive disc (flywheel) when the clutch is disengaged would yield this result.

SUMMARY OF THE INVENTION

According to the present invention there is provided a disc type clutch for rotationally coupling a drive disc which flywheel or pressure plate to a shaft (transmission input shaft) having an enhanced separation action of the clutch disc from the flywheel when the clutch is disengaged. Friction material in the form of a plurality of friction pads are bonded to a backing plate to form a clutch button or bonded directly to the clutch disc to form a clutch disc assembly. The clutch buttons of the present invention have circumferential grooves formed in the face of the button which aid in the separation of the clutch disc assembly from the flywheel due to the aerodynamic forces generated by airflow through the separate grooves. A secondary effect is that operating temperature of the clutch disc assembly and especially the clutch buttons are reduced due to the additional cooling airflow created by the grooves formed in the face of the friction material that contacts the flywheel and/or pressure plate when the clutch is engaged.

The circumferential orientation of the grooves increases the aerodynamic forces that enhance the separation characteristics of the clutch disc from the flywheel and/or pressure plate. Also, the volume of air flowing through the grooves is increased as compared to prior art designs using radial grooves.

One provision of the present invention is to enhance the separation characteristics of a clutch disc from a drive disc.

Another provision of the present invention is to enhance the separation characteristics of a clutch disc from a drive disc by using aerodynamic forces.

Another provision of the present invention is to enhance the separation characteristics of a clutch disc from a drive disc by using aerodynamic forces generated by at circumferential grooves formed in a friction button attached to the clutch disc.

Another provision of the present invention is to increase the cooling of a clutch disc by increasing the airflow across the surface of the clutch button attached to the clutch disc.

Still another provision of the present invention is to increase the cooling of a clutch disc by increasing the airflow across the surface of a clutch button attached to the clutch disc with at least two circumferential grooves formed in a face of said clutch button.

BRIEF DESCRIPTION OF THE DRAWINGS

FIG. 3 is a side sectional view of a clutch button shown in FIG. 2 taken in the direction of arrows III;

FIG. 4 is a front elevational view of a first alternative preferred embodiment of the clutch button of the present invention; and FIG. 5 is a front elevational view of a second alternative embodiment of the clutch button of the present invention.

FIG. 6 is a front elevational view of a third alternative embodiment of the clutch button of the present invention.

FIG. 7 is a side elevational view of the third alternative embodiment of the clutch button of the present invention.

FIG. 9 is a front elevational view of a fifth alternative embodiment of the clutch button of the present invention.

FIG. 10 is a broken-out perspective view of a portion of the clutch button of FIG. 9.

FIG. 11 is a front elevational view of a sixth embodiment of the clutch button of the present invention.

FIG. 12 is a broken-out perspective view of a portion of the clutch button of FIG. 11.

DETAILED DESCRIPTION OF THE PREFERRED EMBODIMENT

Figure 1:
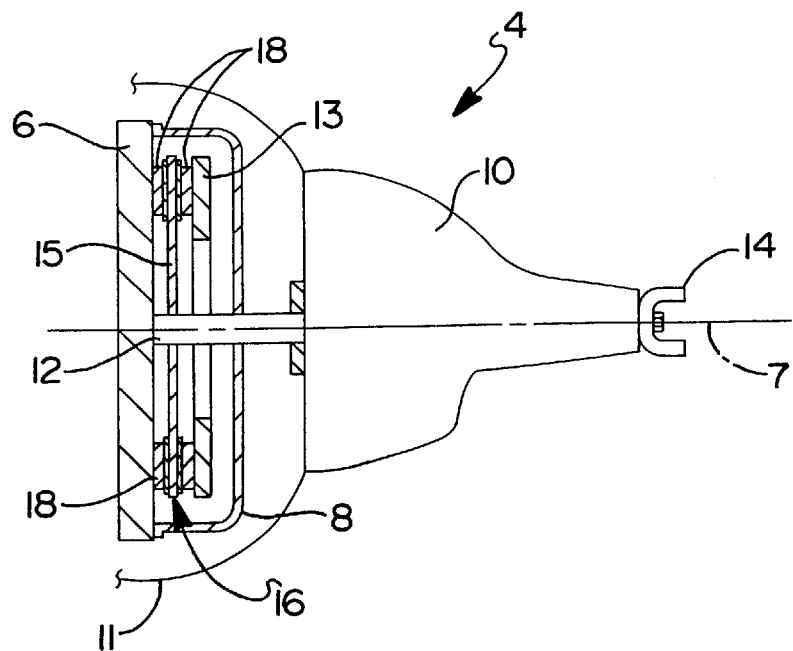
FIG. 1 is a side elevational view clutch button of the present invention attached to a friction disc.

Certain terminology will be used in the following description for convenience in reference only and will not be limiting. For example, the terms "forward" and "rearward" will refer to directions forward and rearward of a transmission as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Referring to FIG. 1 of the drawings, a partial cross-sectional view of a clutch/transmission assembly 4 is shown. An engine flywheel 6 is rotatably coupled to a clutch cover 8. A gear change transmission 10 is nonrotatably mounted to a bellhousing 11 which is mounted to an engine block (not shown). The transmission 10 is driven through the rotation of a transmission input shaft 12 about an axis 7 which eventually rotates a transmission drive yoke 14 which is attached to the balance of the vehicle driveline (not shown).

Figure 2:
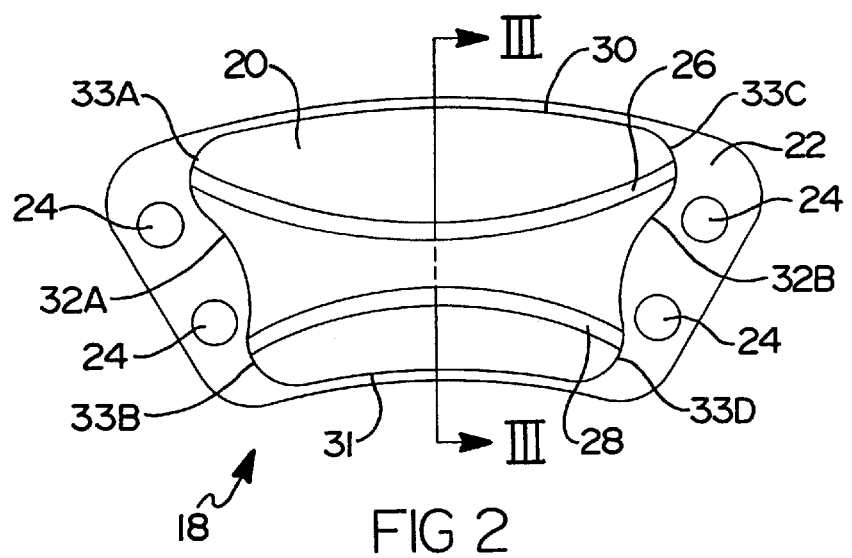
FIG. 2 is a front elevational view of a first preferred embodiment clutch button of the present invention.

Now referring to FIG. 2 of the drawings, a front elevational view of a clutch button 18 of the present invention is shown. A friction pad 20 is bonded or otherwise attached to a backing plate 22 to form the clutch button 18. The clutch button 18 is riveted or otherwise attached to a clutch disc 16 (FIG. 1) to form a clutch disc assembly 15.

The transmission input shaft 12 is rotated by the flywheel 6 through frictional engagement of a clutch disc assembly 15 with flywheel 6. The clutch disc assembly 15 is typically nonrotatably slideably mounted to the input shaft 12 of the gear change transmission 10 and disposed between the engine flywheel 4 and a clutch pressure plate 13. Commonly shaft 12 and disc assembly 15 have complementary mating splines enabling disc assembly 15 to axially slide along shaft 12 while rotating as a unit therewith.

FIG. 2 is a front elevational view of a clutch button 18 of the present invention. The clutch button 18 includes a friction pad 20 composed of friction material bonded to a backing plate 22 using known methods. The friction pad 20 is preferably formed of ceramics but other known friction materials may be used for this invention. The clutch button 18 is attached to the clutch disc 16 using an attachment means such as rivets placed through the mounting apertures 24 formed in the backing plate 22 and into the clutch disc 16. Disc 16 is integrated into disc assembly 15. According to the present invention, first groove 26 and second groove 28 are formed in the face of the friction pad 20. The friction pad 20 has a radial outer edge 30 and a radial inner edge 31 and inward circumferential outer edges 32A and 32B. The inward circumferential outer edge 32A is joined to the radial outer edge 30 by upper outward circumferential edge 33A and to the radial inner edge 31 by lower outward circumferential edge 33B. The inward circumferential outer edge 32B is joined to the radial outer edge 30 by upper outward circumferential edge 33C and to the radial inner edge 31 by lower outward circumferential edge 33D.

Now referring to FIG. 3 of the drawings, a cross-sectional view of the clutch button of the present invention in the direction of arrows III of FIG. 2 is shown. The friction pad 20 is bonded to the backing plate 22 and has both first and second grooves 26, 28 formed therein. The second groove 28 is shown having a cross-sectional groove width W and a cross-sectional groove depth D. An exemplary dimension for the groove width W is 0.090 inches (2.3 mm) and a corresponding groove depth D is 0.060 inches (1.5 mm) in a friction pad 20 that has a thickness T of 0.165 inches (4.2 mm). Alternative dimensions for the groove width W and groove depth D can be selected as determined for a particular clutch design.

Referring once again to FIG. 2, the first groove 26 extends to connect the upper outward circumferential edge 33A with the upper outward circumferential edge 33C and curves towards the radial inner edge 31 near the midpoint. In a similar fashion, but curving toward the radial outer edge 30 at its midpoint, the second groove 28 extends to connect the lower outward circumferential edge 33B with the lower outward circumferential edge 33D. Thus, the first groove 26 and the second groove 28 curve toward one another to achieve a minimum separation distance at approximately the center of the friction pad 20. Neither groove 26 nor groove 28 are concentric with axis 7 to prevent the development of a corresponding ridge on the pressure plate 13 and the flywheel 6.

Now referring to FIG. 4, a front elevation view of a first alternative embodiment of the clutch button 18A is shown. The friction pad 20A is bonded to the backing plate 22 where the friction pad 20A differs from the friction pad 20 shown in FIG. 2 in that the first and second grooves 26, 28 have been modified to cross at approximately the lower central section of the friction pad 20A. A first groove 34 which extends in a substantially straight manner connects the upper outward circumferential edge 33A with the lower outward circumferential edge 33D while a second groove 36 extends in a substantially straight manner to connect the lower outward circumferential edge 33B with the upper outward circumferential edge 33C crossing the first groove 34 in the process.

Now referring to FIG. 5, a second alternative embodiment of the clutch button 18B of the present invention is shown. A friction pad 20B is bonded or otherwise attached to a backing plate 22 which is riveted to a clutch disc 16 through mounting apertures 24. The friction pad 20B includes a radial outer edge 30 and a radial inner edge 31. Forming the left side of the friction pad 20B is a first upper outward circumferential edge 33A which joins a first inward circumferential outer edge 32A which joins a first lower outward circumferential edge 33B. Forming the right side of the friction pad 20B is a second upper outward circumferential edge 33C which joins a second inward circumferential outer edge 32B which joins a second lower outward circumferential edge 33D.

A first curvilinear groove 34' generally runs from the first upper outward circumferential edge 33A to the second lower outward circumferential edge 33D while a second curvilinear groove 36' generally runs from the first lower outward circumferential edge 33B to the second upper outward circumferential edge 33C.

In FIG. 5, the first groove 34' is comprised of a section 34'A which generally has a center of curvature which lies below the clutch button 18B which is joined to a section 34'B which generally has a center of curvature which lies above the clutch button 18B. In a similar manner, the second groove 36' is comprised of a section 36'A which generally has a center of curvature which lies below the clutch button 18B which is joined to a section 36'B which generally has a center of curvature which lies above the clutch button 18B. The first groove 34' intersects the second groove 36' at approximately the center of the friction pad 20B.

Referring to FIGS. 6 and 7, a third alternative embodiment clutch button 18C is presented. The button 18C has a first groove 126 and an intersecting second groove 128. Friction pad 120 has a radial outer edge 130 and a radial inner edge 131. The friction pad 120 also has inward circumferential outer edges 132A and 132B on its outer face. The inward circumferential edge 132A is adjoined to the radial outer edge 130 by upper outward circumferential edge 133A and to the radial inner edge 131 by lower outward circumferential edge 133B. The inward circumferential outer edge 132B is joined to the radial outer edge 130 by upper outward circumferential edge 133C. The inward circumferential outer edge 132B is joined into the radial inner edge 131 by lower outward circumferential edge 133D. The pad 120 has a tapered or scalloped leading edge portion 144. The pad has a tapered trailing edge portion 146.

In operation, the clutch disc rotates in the direction of arrow 156 shown in FIG. 7. Air is forced toward flywheel 6 and into grooves 126 and 128 by the tapered portion 144 of the friction pad. The clutch button 18C along the sides of its backing plate 122 has a portion 148 which is not covered by the pad 120. The portion 148 of the backing plate has extending therethrough apertures 124 to allow attachment of the button 18C to the clutch disc 16. Since tapered portions 144 and 146 are on both the leading and trailing ends, the clutch button 18C can be used on either side of the clutch disc 16.

Figure 8:
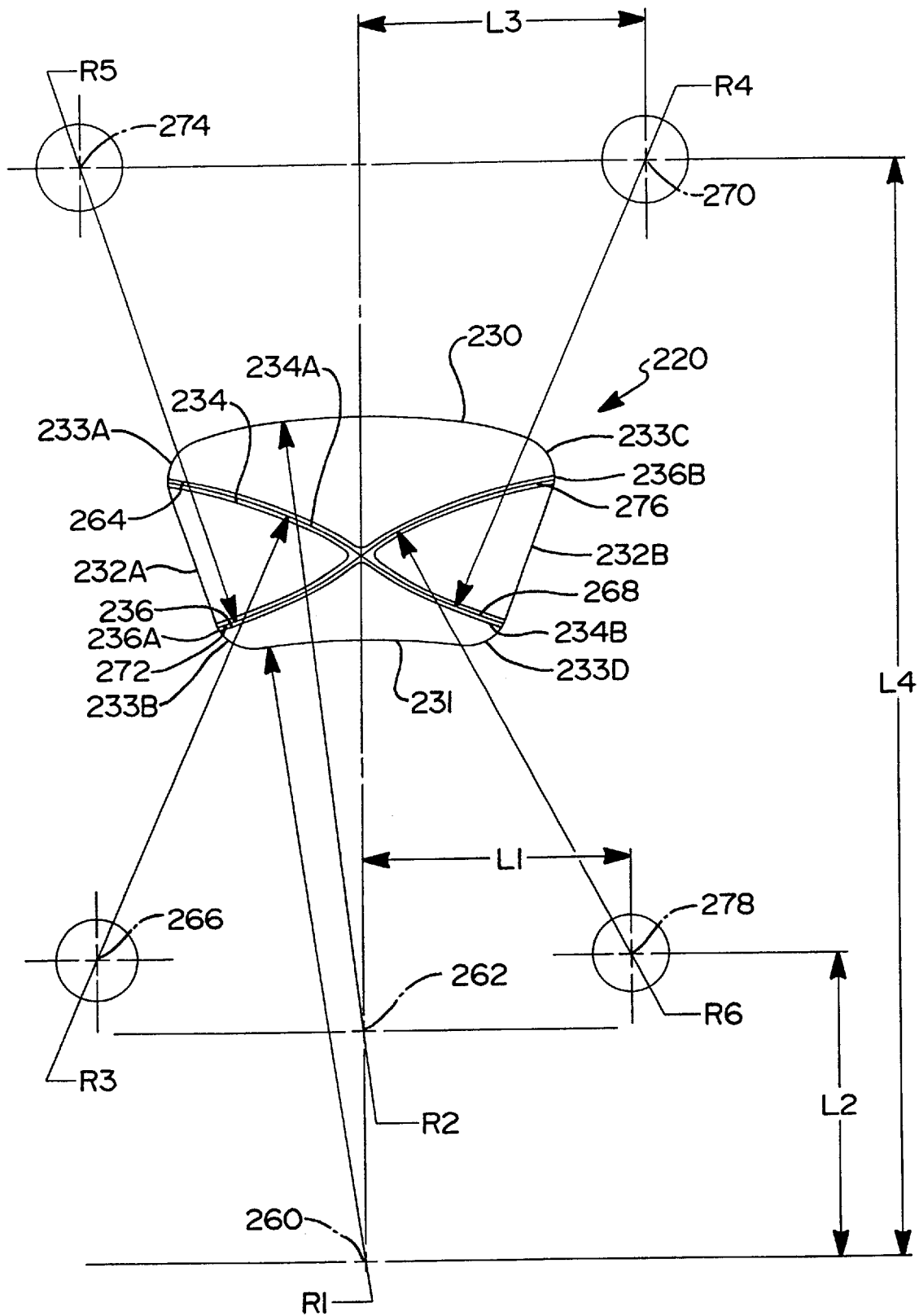
FIG. 8 is a front elevational view of a fourth alternative embodiment of the clutch friction pad of the present invention.

FIG. 8 shows another embodiment of a friction pad 220. The friction pad 220 has a radial outer edge 230 of radius R1 centered at point 260, and a radial inner edge 231 centered at a point 262. Outer edges 232A and 232B fall on straight lines extending from point 262, separated by approximately 40° from each other. Inward circumferential outer edge 232A is connected to radial outer edge 230 by upper outward circumferential edge 233A, and to radial inner edge 231 by lower outward circumferential edge 233B. Inward circumferential outer edge 232B is connected to radial outer edge 230 by upper outward circumferential edge 233C, and to radial inner edge 231 by lower outward circumferential edge 233D.

First groove 234 extends diagonally across pad 220 from edge 233A to edge 233D. Second groove 236 extends diagonally across pad 220 from edge 233B to edge 233C, intersecting first groove 234. Grooves 234 and 236 are not straight. Each of 234 and 236 have two distinct radii of curvature. A centerline 264 of a first groove portion 234A of groove 234 has a radius of R3, centered at point 266. A centerline 268 of a second groove portion 234B of groove 234 has a radius of R4, centered at point 270. Centerlines 264 and 268 are continuous, with portions 234A and 234B being correspondingly continuous. A centerline 272 of a first groove portion 236A of groove 236 has a radius of R5, centered at point 274. A centerline 276 of a second groove portion 236B of groove 236 has a radius of R6, centered at point 278.

An exemplary value for radii R3 through R6 is 5.000 inches (127 mm). Exemplary values for radii R1 and R2 are 6.377 inches (162.0 mm) and 6.375 inches (161.9 mm) respectively. Point 278 is offset from point 260 by L1 and L2. Point 270 is offset from point 260 by L3 and L4. Exemplary values of L1, L2, L3 and L4 are 2.753 inches (69.93 mm), 3.095 inches (78.61 mm), 2.928 inches (74.37 mm) and 11.322 inches (287.58 mm) respectively. Points 266 and 274 are similarly spaced from point 260.

FIGS. 9 and 10 show yet another alternative embodiment of a clutch button 318. A first groove 334 and a second groove 336 cross a friction pad 320 in essentially the same manner in which grooves 234 and 236 cross friction pad 220. However, the leading and trailing edge portions 344 and 346 respectively have a radiused taper which is intended to force air between the friction pad 320 and the pressure plate. Air forced therebetween will help separate the two parts, reducing clutch drag.

FIGS. 11 and 12 show a further alternative embodiment of a clutch button 418. A first groove 434 and a second groove 436 cross a friction pad 420 in essentially the same manner in which grooves 234 and 236 cross friction pad 220. However, the leading and trailing edge portions 444 and 446 respectively have a scalloped taper which tapers downwardly toward backing plate 422 as well as inwardly toward the center of friction pad 420 from start points proximate to the intersection of grooves 234 and 236 with leading and trailing edge portions 444 and 446. The scalloped edge portions 444 and 446 are intended to force air between friction pad 420 and the pressure plate. Air forced therebetween will help separate the two parts, reducing clutch drag.

Clutch drag is an undesired characteristic of clutch operation using prior art clutch buttons. After disengagement, the clutch disc will in some instances continue to contact or drag against one of the pressure plate and the engine flywheel. The clutch drag results in difficult shifting of the transmission between gear ratios since power is still being transferred through the dragging clutch disc to the transmission input shaft. The present invention operates to significantly reduce the amount of clutch drag by using aerodynamic forces generated when grooves are formed in the surface of the friction pads and by providing an optimal cooling flow path for air. Air flow through the grooves facilitates separation of the clutch disc from the clutch pressure plate and the engine flywheel, thereby reducing the clutch disc drag and facilitating transmission shifting. Tapered portions 144 and 146 further facilitate separation of the disc assembly from both the pressure plate and the flywheel by directing a greater flow of air therebetween.

As noted above, the grooves formed in the friction pad also increase cooling of the friction pad. Clutch drag tends to increase with. higher operating temperatures. The cooling effect of the friction pad grooves thus serves to reduce clutch drag.

The embodiments disclosed herein have been discussed for the purposes of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims. Examples of such variations include providing an enlarged opening or mouth for the grooves which tapers to the narrower width W of the grooves and employing radiused corners at the ends of the grooves and at the intersection of the grooves to facilitate molding of the grooves in the friction material.

What is claimed is:

1. A clutch button comprising:
   a friction pad formed of a friction material having a first surface and a second surface said first surface opposing said second surface, and said friction pad having a radial outer edge and a radial inner edge said radial outer edge opposing said radial inner edge, and said friction pad having a first upper outward circumferential edge and a second upper outward circumferential edge both being adjacent to said radial outer edge, and said friction pad having a first lower outward circumferential edge and a second lower outward circumferential edge both being adjacent to said radial inner edge, and said friction pad having a first inward circumferential outer edge joining said first upper outward circumferential edge to said first lower outward circumferential edge, and said friction pad having a second inward circumferential outer edge joining said second upper outward circumferential edge to said second lower outward circumferential edge, and said first surface having a first groove formed therein extending from said first upper outward circumferential edge to one of said second upper and lower outward circumferential edges, and a second groove is formed in said first surface extending from said first lower outward circumferential edge to said another one of said second upper or lower circumferential edges said first groove does not extend to; and a backing plate bonded to said second surface.

2. A clutch button as described in claim 1, wherein said first groove extends from said first upper outward circumferential edge to said second upper outward circumferential edge and said second groove extends from said first lower outward circumferential edge to said second lower outward circumferential edge.

3. A clutch button as described in claim 1, wherein said first groove extends from said first upper outward circumferential edge to said second lower outward circumferential edge and said second groove extends from said first lower outward circumferential edge to said second upper outward circumferential edge.

4. A clutch button as described claim 1, wherein said first and second grooves are curvilinear.

5. A clutch button as described in claim 4, wherein said curvilinear grooves are formed along at least two separate radii with one radius being centered above said clutch button and one radius being centered below said clutch button.

6. A clutch button as described in claim 3, wherein said first and second grooves are substantially straight.

7. A clutch button as described in claim 1, wherein said first and second grooves have a generally square cross-sectional shape.

8. A clutch button as described in claim 1, wherein said first and second grooves have a semi-circular cross-sectional shape.

9. A clutch button as described in claim 1, wherein at least one of said grooves is intersected by a tapered portion of said friction pad.

10. A clutch button as described in claim 9, wherein said friction pad has a tapered portion intersecting said first and second grooves.

11. A clutch button as described in claim 10, wherein said friction pad has tapered portion on front and rear ends of said friction pad.

12. A clutch button as described in claim 1, wherein at each of said grooves follows a curvilinear path defined by a first radius centered at a point above the button and offset to a first side of the button and a second radius centered at a point below the button and offset to a second side of the button, the second side being opposite the first side.

13. A clutch button comprising:

a friction pad formed of a friction material having a first surface and a second surface said first surface opposing said second surface, and said friction pad having forward and rear ends wherein said friction pad is tapered from said second surface to said first surface, and said friction pad first surface having a radial outer edge and a radial inner edge, said radial outer edge opposing said radial inner edge, and said friction pad first surface having a first upper outward circumferential edge and a second upper outward circumferential edge both being adjacent to said radial outer edge, and second friction pad first surface having a first lower outward circumferential edge and a second lower outward circumferential edge both being adjacent to said radial inner edge, and said friction pad first surface having a first inward circumferential outer edge joining said first upper outward circumferential edge to said first lower outward circumferential edge, and said friction pad having a second inward circumferential outer edge joining said second upper outward circumferential edge to said second lower outward circumferential edge, and said first surface having a first groove formed therein extending from said first upper outward circumferential edge to one of said second upper and lower outward circumferential edges, and a second groove is formed in said first surface extending from said first lower outward circumferential edge to said another one of said second upper or lower circumferential edges said first groove does not extend to; and a backing plate bonded to said second surface.

* * * * *